US012657233B2

(12) United States Patent (10) Patent No.: US 12,657,233 B2
    Jayakrishnasamy                        (45) Date of Patent: Jun. 16, 2026

(54) ARTIFICIAL INTELLIGENCE BASED COMMUNICATION SYSTEM FOR NETWORK ISSUE RESOLUTION

(71) Applicant: Verizon Patent and Licensing Inc., Basking Ridge, NJ (US)

(72) Inventor: Miruna Jayakrishnasamy, Vellore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/604,707

(22) Filed: Mar. 14, 2024

(65) Prior Publication Data

US 2025/0291832 A1     Sep. 18, 2025

(51) Int. Cl.
    *G06F 16/38*      (2019.01)
    *G06F 16/353*     (2025.01)
    *G06Q 30/015*     (2023.01)
(52) U.S. Cl.
    CPC ............ *G06F 16/38* (2019.01); *G06F 16/353* (2019.01); *G06Q 30/015* (2023.01)
(58) Field of Classification Search
    CPC ...... G06F 16/38; G06F 16/353; G06Q 30/015
    See application file for complete search history.

(56) References Cited

U.S. PATENT DOCUMENTS

| | | | | |
|---|---|---|---|---|
| 2017/0353991 A1* | 12/2017 | Tapia | .................. | H04L 41/0631 |
| 2020/0204680 A1* | 6/2020 | Prakash | ................ | G06N 20/00 |
| 2021/0083926 A1* | 3/2021 | Costa | .................. | H04L 41/0686 |
| 2022/0141715 A1* | 5/2022 | Mayor | .................. | H04W 24/02 |
| | | | | 370/254 |
| 2023/0261932 A1* | 8/2023 | Seetharaman | .......... | H04L 41/40 |
| | | | | 709/223 |
| 2023/0275973 A1* | 8/2023 | Sakamoto | ........... | H04L 41/5067 |
| | | | | 709/224 |
| 2024/0121636 A1* | 4/2024 | Wang | ...................... | H04L 41/16 |
| 2024/0171480 A1* | 5/2024 | Sheoran | .............. | H04L 41/5067 |

* cited by examiner

*Primary Examiner* — Jensen Hu

(57) ABSTRACT

One or more computing devices, systems, and/or methods for providing an artificial intelligence based communication system for network issue resolution are provided. Featured related to operation of a communication network are input into one or more models to generate a set of resolution recommendations related to a low signal detected with respect to the communication network. A resolution recommendation is selected and provided as solution content to users of the communication network and/or to agents troubleshooting issues for users. Post recommendation metrics are used to identify a user that has not implemented a resolution action described by the solution content. Accordingly, a follow-up notification is sent to the user as a reminder to perform the resolution action.

20 Claims, 13 Drawing Sheets

Figure 2:
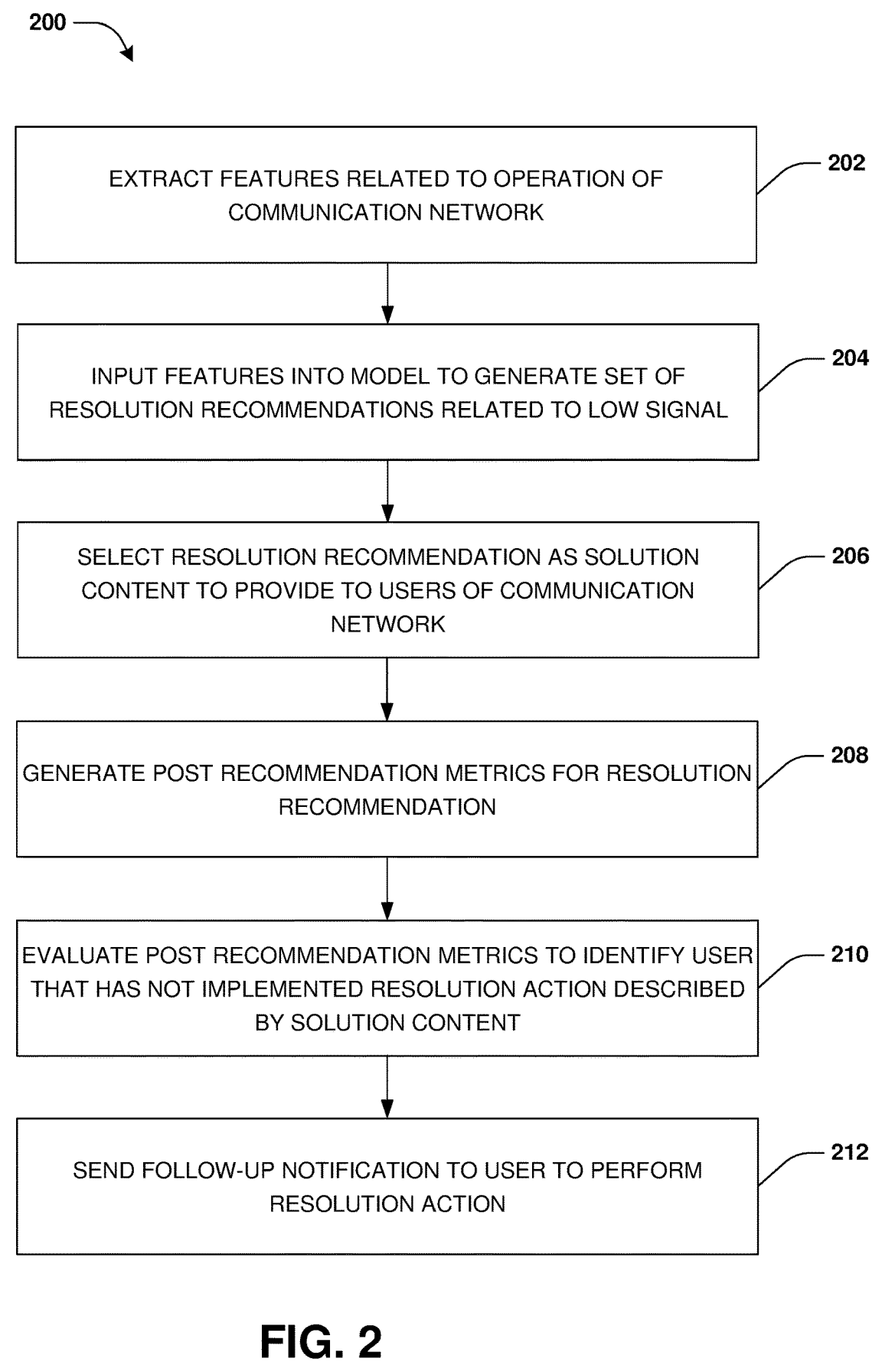

```
┌─────────────────────────────────────────────────────┐
│      EXTRACT FEATURES RELATED TO OPERATION OF         │── 202
│            COMMUNICATION NETWORK                      │
└─────────────────────────────────────────────────────┘
                          │
                          ▼
┌─────────────────────────────────────────────────────┐
│     INPUT FEATURES INTO MODEL TO GENERATE SET OF      │── 204
│  RESOLUTION RECOMMENDATIONS RELATED TO LOW SIGNAL     │
└─────────────────────────────────────────────────────┘
                          │
                          ▼
┌─────────────────────────────────────────────────────┐
│   SELECT RESOLUTION RECOMMENDATION AS SOLUTION        │── 206
│   CONTENT TO PROVIDE TO USERS OF COMMUNICATION        │
│                   NETWORK                             │
└─────────────────────────────────────────────────────┘
                          │
                          ▼
┌─────────────────────────────────────────────────────┐
│ GENERATE POST RECOMMENDATION METRICS FOR RESOLUTION   │── 208
│                 RECOMMENDATION                        │
└─────────────────────────────────────────────────────┘
                          │
                          ▼
┌─────────────────────────────────────────────────────┐
│ EVALUATE POST RECOMMENDATION METRICS TO IDENTIFY USER │── 210
│ THAT HAS NOT IMPLEMENTED RESOLUTION ACTION DESCRIBED  │
│               BY SOLUTION CONTENT                     │
└─────────────────────────────────────────────────────┘
                          │
                          ▼
┌─────────────────────────────────────────────────────┐
│  SEND FOLLOW-UP NOTIFICATION TO USER TO PERFORM       │── 212
│               RESOLUTION ACTION                       │
└─────────────────────────────────────────────────────┘
```

| 551 Resolution Type | 552 Customer Queries | 553 Resolution | 554 Resolution content derived from |
|---|---|---|---|
| Troubleshoot/Fix | How to activate internet in phone YYY? | Follow step 1 to 4 to activate the device<br>Step1:Login the profile<br>Step2: click activate.OTP will be generated<br>Step3: Enter OTP<br>Step4: Verify with push notification and complete | Derived by LLM from previous answer |
| Network Device Recommendations | I'm in XXX plan but not working fine and unable to do wfh | If you use Femtocell, then your problem would be resolved | Network device Fempocell  is recommended from recommender model |
| Plan Change Recommendation | I'm in XXX plan but not working fine and unable to do wfh | Upgrade to YYY plan so that it would be better for you | Plan YYY is recommended from recommender model |
| article | How to activate internet in phone? | FAQ_Device_Activation.html  will be shared with customer | Article |
| Length of time | Due to natural calamity, tower is not working and it may take X days to get it recovered | Timeline to restore network will be sent as group messages to that locality | Derived by LLM from previous answer |

| Resolution type | Customer Queries | Resolution | Resolution content derived from |
|---|---|---|---|
| 561 | 562 | 563 | 564 |
| Troubleshoot/fix | How to active internet on phone yyy | Follow these steps to active device... | Derived from previous answer |
| Troubleshoot/fix | How to active internet on phone xxx | Follow these steps to active device... | Article |
| Device exchange | Using plan xxx but not working fine in device xxx | You have offer to exchange device | Derived from previous answer |
| Device Recommendation | Using plan xxx but not working fine in device xxx | Upgrade to YYY device | Device Fempocell is recommended from model |
| Network Device Recommendation | Using plan xxx but not working fine and unable to do... | Use femtocell to fix | Network Device Fempocell is recommended from model |
| Plan change Recommendation | Using plan xxx but not working fine and unable to do... | Upgrade to YYY plan | Plan YYY recommended by model |
| Need network but no service found | No service here, but can I get service in future? | No service for location | Derived from previous answer |
| No solution | Cannot active internet in device xxx | Existing bug not fixed yet | Derived from previous answer |
| Article | How to active internet on phone | Share device activation FQA with customer | Article |
| Length of time | Tower not working, may take X days to fix | Time to restore network sent as group message to locality | Derived from previous answer |

| City | Troubleshoot/ Fix | Device Exchange | Device Recommendations | Network Device Recommendations | Plan Change Recommendation | Need Network But No Service Found | No solution | article | Length of time |
|---|---|---|---|---|---|---|---|---|---|
| Newyork | 10000 | 5345 | 5687 | 24 | 45 | 5467 | 2324 | 121 | 651 |
| Alexander City | 5000 | 6565 | 312 | 6 | 23 | 67 | 1314 | 343 | 1232 |
| Andalusia | 2000 | 674 | 90 | 765 | 242 | 5 | 34 | 24 | 0 |
| Anniston | 2324 | 2 | 343 | 433 | 5353 | 0 | 1212 | 1 | 0 |
| Athens | 5 | 534 | 3 | 221 | 23 | 90 | 343 | 0 | 0 |
| Atmore | 3 | 454 | 23 | 344 | 54 | 1012 | 54 | 232 | 12 |
| Auburn | 4 | 646 | 24 | 12 | 656 | 0 | 0 | 0 | 0 |
| Bessemer | 465 | 757 | 14 | 34 | 677 | 0 | 34 | 0 | 0 |
| Birmingham | 76 | 23 | 6 | 56 | 35 | 0 | 50 | 3 | 5 |
| Chickasaw | 100 | 13 | 0 | 2 | 23 | 0 | 23 | 2 | 0 |

FIG. 5F

ARTIFICIAL INTELLIGENCE BASED COMMUNICATION SYSTEM FOR NETWORK ISSUE RESOLUTION

BACKGROUND

Service providers, such as a network service provider of a communication network, receive a vast amount of data from various communication channels that may include social media, a customer calling a service center, emails, forums, blogs, customer reviews, surveys, chats, etc. The data may relate to products, services, and/or issues that users are experiencing. A majority of users may never reach out to a support team about an issue (e.g., degraded cell phone performance, dropped calls, voicemail access issues, network connectivity issues, etc.). Once an issue becomes severe enough, the users may disconnect service without ever having reached out for support to fix the issue.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 1 illustrates an example of an artificial intelligence (AI) based communication system for network issue resolution, in accordance with an embodiment of the present technology;

FIG. 2 is a flow chart illustrating an example method for providing an AI based communication system for network issue resolution, in accordance with an embodiment of the present technology;

FIGS. 5D-5F illustrates examples of charts related to the operation of an AI based communication system, in accordance with an embodiment of the present technology;

DETAILED DESCRIPTION OF EXAMPLE EMBODIMENTS

Figure 3:
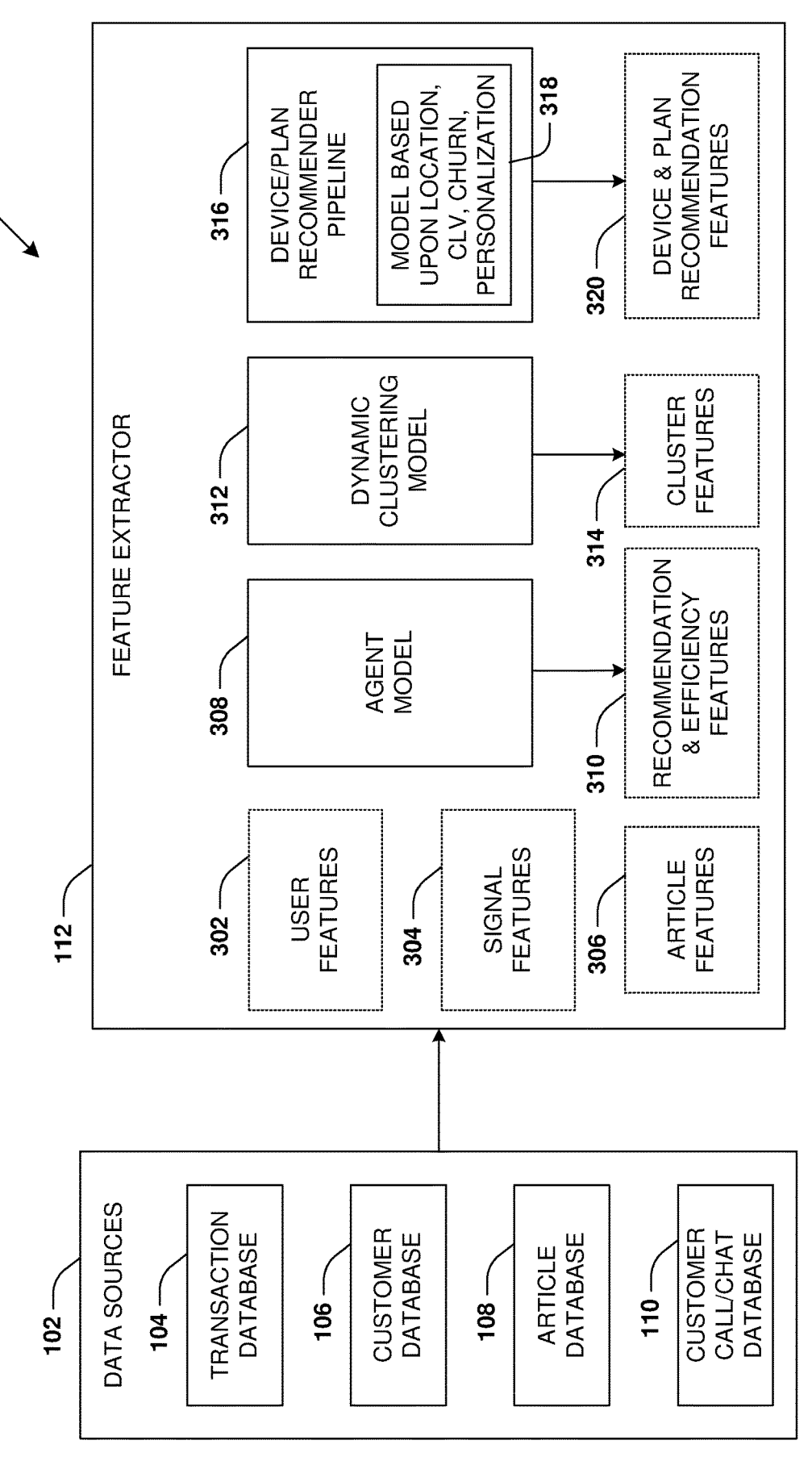
FIG. 3 illustrates an example of a system that includes a feature extractor, in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

Customers of a network service provider may connect to and communicate over a communication network using various types of user equipment (UE) based upon different service plans. For example, a user may have a service plan with the network service provider for connecting a smart watch to the communication network. Another user may have a service plan with the network service provider for connecting a cellular phone to the communication network. The service plan may specify that the UE is to receive certain functionality such as a certain amount of data usage, a certain communication speed, a certain amount of data storage, etc.

The network service provider may provide various support channels for users such as call centers, chatbots, frequently asked questions, forums, online articles, and/or agents available to provide support through chat, email, etc. Unfortunately, many users never report issues or negative experiences to customer service (e.g., 45% of users may never report an issue such as a network outage or network interruption). The issues may relate to dropped calls, network connectivity issues, failures to send or receive text messages, voicemail inaccessibility, performance degradation, and/or a variety of other issues affecting the technical operation of UE. A smaller percentage of users may reach out to customer service for solving an issue (e.g., 15% of users may call customer service). Some users may attempt to use self-care apps to try to solve problems (e.g., merely 40% of users). A significant number of users will only report an issue once the users are frustrated (e.g., 40% of users will report an issue once very upset), and many of these users proceed straight to disconnecting service. Thus, many users cancel their service plans, which may be referred to as churn. This churn (loss of customers) becomes even more problematic when the network service provider is unable to proactively identify network issues, and communication the right resolutions before the customers reach the point of cancelling service. This affects the operation of the communication network and UE connected to the communication network because network issues and resolutions for the network issues are not identified and provided to users. Thus, UE will experience performance degradation, outages, and/or other operational issues that could otherwise be solved by identifying and providing resolution recommendations to users of the communication network.

Systems and methods are provided for an AI based communication system for network issue resolution. The AI based communication system identifies current network issues or potential network issues associated with a communication network (e.g., a low signal strength between UE and network equipment such as a cell tower that can result in dropped calls, slow data speeds, difficulty connected to the internet, poor call quality, etc.). The AI based communication system utilizes various AI/ML models and features to generate recommendation solutions for solving the network issue. The AI based communication system selects a solution that has a highest probability of solving the network issue, and provides the solution to a user to implement (e.g., a troubleshoot step to perform, a configuration setting to modify, an article to read, a recommendation to change to a different UE model, etc.). The solution may be provided to a user who has reported an issue, or may be preemptively provided to a user who has not yet reported an issue. The solution may also be provided to an agent that is helping resolve an issue for a user. In this way, various AI/ML models are used to generate and provide solutions to users.

Additionally, the AI based communication system tracks what solutions solved certain network issues for users. This information can be used to train and improve the AI/ML models (e.g., weights associated with features used to select a solution that worked may be increased, while weights associated with features used to select a solution that didn't work may be decreased). This information is also used to identify whether a user implemented a solution that was identified as solving an issue for other users that implemented the solution. The AI based communication may send a follow-up reminder to the user to implement the solution. In this way, the AI based communication system helps resolve network issues sooner than if a network provider waited for customers to report problems as many customers may wait or never report a problem until deciding to cancel service with the network provider.

Figure 1:
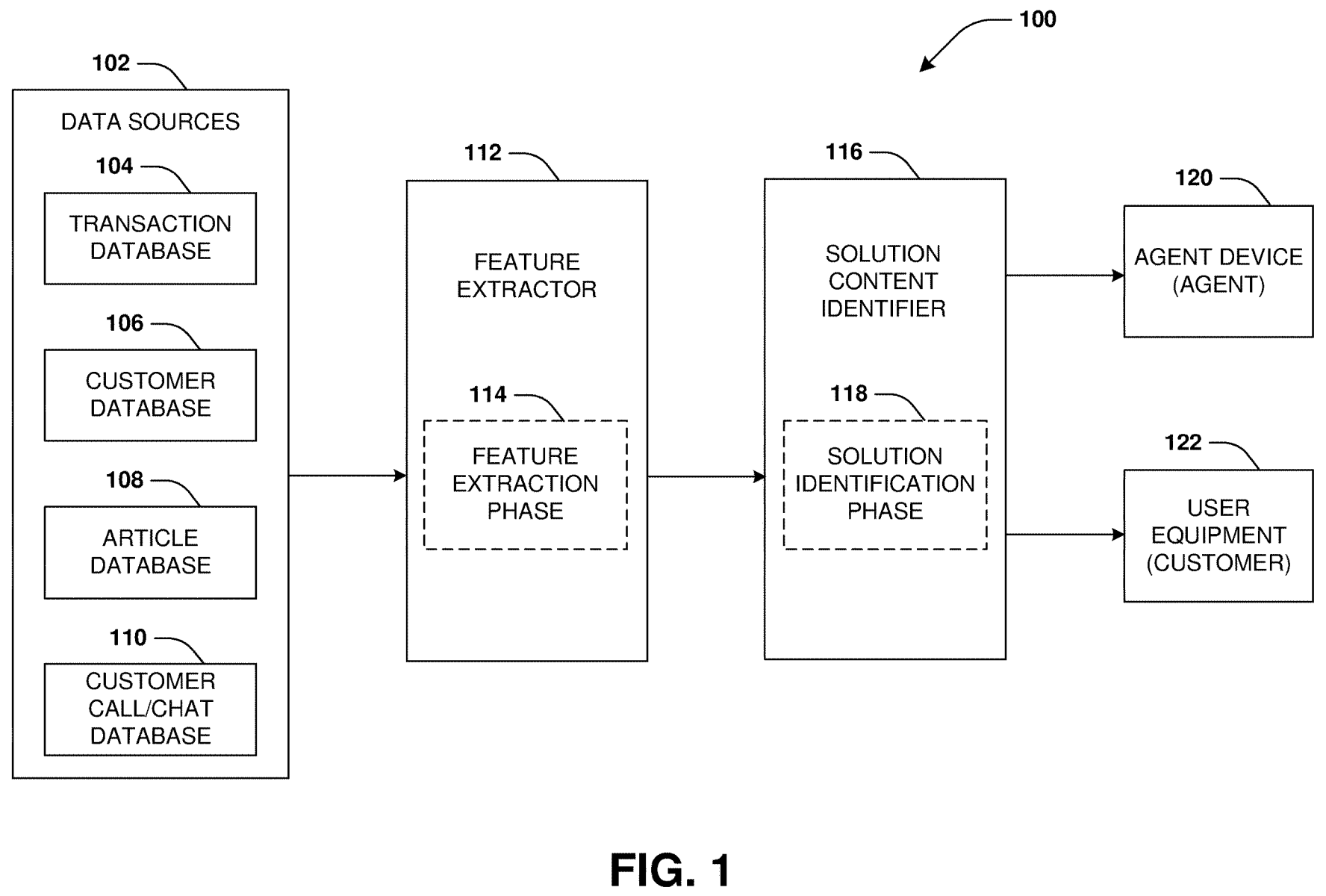

FIG. 1 illustrates an example of an AI based communication system 100 for network issue resolution. In some embodiments, the AI based communication system provides an end-to-end solution for identifying users who have or could experience long term or short term network issues. The AI based communication system utilizes artificial intelligence models to identify resolution recommendations and communication systems/mediums for communicating the resolution recommendations to users and/or agents providing support for the users. The resolution recommendations may pertain to user implemented troubleshooting steps, a device exchange recommendation, a network device recommendation, a plan change recommendation, an article to read, a length of time until a fix can be implemented, or other actions/notifications. In this way, users are provided with the right solution before having to reach out to customer service or other support team for resolving issues.

The AI based communication system includes both batch and real-time systems for recommending resolutions to users and agents. The batch system may identify users that have network issues and have not yet reached out to a support system for help or have recently experienced network issues. The AI based communication system proactively identifies network issues before users reach out to the support system such as before a user calls customer support, utilizes a support chat, etc. Thus, the AI based communication system provides users with resolution recommendations before the users reach out for support, thus improving user experience with network services of the communication network. The real-time system provides resolution recommendations in real-time as the user reaches out to support systems for network issues or queries. Users that have network issues or outages are guided by the real-time system to an appropriate solution. In this way, network issues and outages can be preemptively identified and resolved by the batch system, and the real-time system provides real-time solutions for users that have reached out for resolutions to network issues and outages. This improves the operation of the communication network and UE connected to the communication network because resolution recommendations can be proactively provided/implemented or provided/implemented in real-time to resolve network issues and outages that would otherwise affect the performance and operation of the UE.

The AI based communication system reduces agent handling time to resolve network related issues or clarifications with users because first time calls and repeat calls from users are avoided. The support calls from the users are avoided because resolution recommendations can be proactively identified and provided to users. The overall number of service calls is reduced because the AI based communication system can automatically generate and transmit resolution recommendations to users for resolving (preemptively resolving) issues. By providing the correct resolution recommendation in a timely manner to users will reduce the length of service disruption and performance degradation, along with reducing churn of customers cancelling service plans with the network service provider.

The AI based communication system 100 may include a feature extractor 112 and/or a solution content identifier 116 that utilizes various models to identify and generate resolution commendations. The feature extractor 112 may implement a feature extraction phase 114 utilizing various features and models that identify low signals within a communication network (e.g., a low signal strength between UE and network equipment such as a cell tower that can result in dropped calls, slow data speeds, difficulty connected to the internet, poor call quality, etc.), cluster features with weights of clusters generated by a dynamic cluster model, resolution recommendations generated by an agent model, relevant articles identified by a document similarity model, recommendations and efficiencies of recommendations based upon historical data, and/or recommendations of devices and plans based upon location, service cancellations, customer lifetime values, personalization, etc.

The feature extractor 112 may identify features from data sources 102 such as a transaction database 104 of transactions between users and a network service provider of the communication network, a customer database 106 of customer/user information, an article database 108 of articles (e.g., FAQ articles, troubleshooting articles, configuration articles, UE manuals, network device manuals, etc.), and a customer call/chat database 110 relating to customers calling or chatting with customer service agents or chatbots. The feature extractor 112 my extract features such as user features that include a user location, a communication plan, data usage, plan pricing, and/or a number of issues occurring over various timespans. The feature extractor 112 may extract other features such as signal features, potential resolution recommendations, efficiencies of the potential resolution recommendations, etc.

The solution content identifier 116 may implement a solution identification phase 118 that utilizes various features and models to identify a resolution recommendation to provide as solution content to an agent device 120 of an agent helping a user with solving an issue and/or to user equipment 122 of a user (a customer of the network service provider) to implement for solving the issue. The solution content identifier 116 may select a resolution recommendation from a set of resolution recommendations that may include a troubleshooting action, a device exchange action, a device recommendation, a network device recommendation, a plan change recommendation, a network needed but no service found notification, a no solution notification, an article to read, and/or a length of time until an issue is resolved. In this way, the selected resolution recommendation is provided to either the agent device 120 of an agent helping the user in real-time (e.g., if the user is currently interacting with the agent) or to user so that the user can implement the resolution recommendation (e.g., if the user is not currently interacting with the agent).

The solution content identifier 116 may identify post recommendation metrics relating to whether resolution recommendations were implemented by users and/or whether the resolution recommendations solved the issues. The post recommendation metrics are evaluated to identify a user that has not implemented a resolution action described by solution content provided to a user from a resolution recommendation. Accordingly, a follow-up notification is provided to the user to perform the resolution action. In this way, resolution recommendations and follow-up notifications are provided to users for pre-emptively solving or solving in real-time issues related to a communication network.

Figure 4:
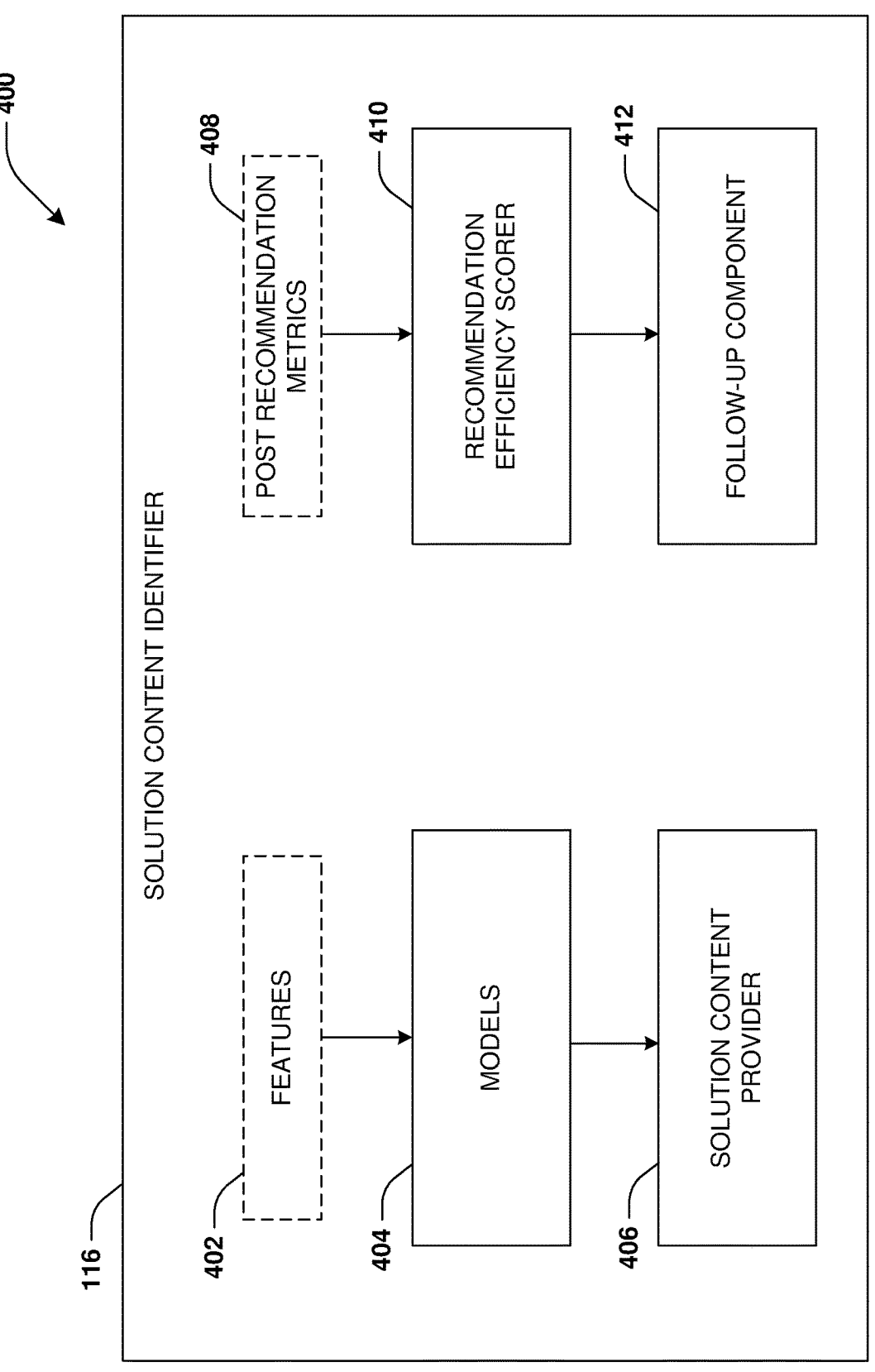
FIG. 4 illustrates an example of a system that includes a solution content identifier, in accordance with an embodiment of the present technology.

FIG. 2 is a flow chart illustrating an example method 200 for providing an AI based communication system for network issue resolution, which is described in conjunction with system 300 of FIG. 3 and system 400 to FIG. 4. The AI based communication system includes the feature extractor 112 and/or the solution content identifier 116. The AI based communication system may determine whether there is a low signal (e.g., a low signal strength between UE and network equipment such as a cell tower that can result in dropped calls, slow data speeds, difficulty connected to the internet, poor call quality, etc.). If a low signal is detected, then UE connected to a network component (e.g., a cellular tower) with the low signal are identified, and messages are sent to the UE or to users of the UE with a resolution time. In some embodiments, if there is no low signal detected, then method 200 is executed.

During operation 202 of method 200, the feature extractor 112 extracts features from the data sources 102 such as from the transaction database 104, the customer database 106, the article database 108, and/or the customer call/chat database 110, as illustrated by FIG. 3. In some embodiments, the features include signal features 304 such as articles and documents relating to cell tower speed and network issue (e.g., tower speed, network_issue_article). The articles may include a network troubleshooting document, a document describing how to configure network equipment to achieve a particular tower speed, etc. From these articles, a model can extract information such as when a network outage can be fixed (e.g., an article may describe a length of time to complete a troubleshooting step). Thus, the model can output information used to notify a customer that an outage may remain from April $5^{th}$ until April $9^{th}$ and is expected to be resolved on April $9^{th}$ based upon content within the articles. In some embodiments, the features include user features 302 comprising user location, communication plan (a network service plan for a cell phone to use the communication network), data usage, plan pricing, and/or a number of issues occurring over one or more timespans (e.g., find location, plan names, netIssue_last1week_ct, netIssue_last2week_ct, netIssue_last3week_ct, netIssue_last4week_ct, churn_ind, prev_clv, curr_clv, data_usage, repeat_call, Plan_Pricing_Bin). In some embodiments, the features include aggregated chat/call features such as the intent of a customer/user, a resolution provided by an agent helping the customer, etc. (e.g., intent: [cust_intent_1, Agent_Res_1, cust_intent_2, Agent_Res_2 . . . ]). In some embodiments, the features include article features 306 relating to topics discussed by articles within the article database 108 (e.g., keywords, phrases, topics, and/or other features extracted from the articles using a document similarity model or other type of model).

In some embodiments, the features include cluster features 314 with weights of clusters in terms of service cancellation (churn), customer lifetime values, risk factors, and/or repeat customer service calls: for each cluster, create cl_churn_score (Total no. of churn/total frequency of cluster), cl_avg_CLV, cl_risk_factor {High: cl_churn_score>0.5 and avg_CLV>thr2, Low}, cl_avg_repeat_calls. For example, cluster C1 with churn rate 0.8, CLV>5000, a high risk factor, and an average repeat call>5 indicates that this is a critical segment were customers are facing high network issues. In this way, customer segments may be derived, and can be used by models (e.g., models 404 implemented by the solution content identifier 116) to understand the criticality of a customer profile so that resolution commendations can be provided to such users. The cluster features 314 may be generated by a dynamic clustering model 312 or other type of model.

In some embodiments, the features include potential resolution recommendations based upon historical data and/or efficiencies of the potential resolution recommendations based upon the historical data. For example, if a service plan change is recommended as a solution, then the service plan change can result in service cancellation, customer lifetime value impact, and/or repeat services call happening, which can be predicted from historical patterns, and this learning is passed as features to a model. These recommendation and efficiency features 310 may be generated by an agent model 308 or other type of model.

In some embodiments, the features associated with the agent model 308 may relate to a troubleshooting/fix score, Total_churn_freq_in_fix/Total_Freq_fix, curr_CLV/avg_CLV_fix, repeatCall/avg_repeatCall_fix, etc. The features associated with the agent model 308 may relate to a device exchange score, score, Total_churn_in_exchange/Total_Freq_exchange, curr_csv/avg_CLV_exchange, repeatCall/avg_repeatCall_exchange, etc. The features associated with the agent model 308 may relate to device recommendation scores, Total_churn_in_DevRec/Total_Freq_DevRec, curr_csv/avg_CLV_DevRec, repeatCall/avg_repeatCall_DevRec, etc. The features associated with the agent model 308 may relate to network device recommendation scores, Total_churn_in_NetRec/Total_Freq_NetRec, curr_csv/avg_CLV_NetRec, repeatCall/avg_repeatCall_NetRec etc. The features associated with the agent model 308 may relate to a plan change recommendation score, Total_churn_in_PCRec/Total_Freq_PCRec, curr_csv/avg_CLV_PCRec, repeatCall/avg_repeatCall_PCRec, etc.

The features associated with the agent model 308 may relate to a need network but no service found score, Total_churn_in_NNNoService/Total_Freq_NNNoService, curr_csv/avg_CLV_NNNoService, repeatCall/avg_repeatCall_NNNoservice, etc. The features associated with the agent model 308 may relate to a no solution score, Total_churn_in_NoSolution/Total_Freq_NoSolution, curr_csv/avg_CLV_NoSolution, repeatCall/avg_repeatCall_NoSolution, etc. The features associated with the agent model 308 may relate to an article score, Total_churn_in_NoSolution/ Total_Freq_art, curr_csv/avg_CLV_art, repeatCall/avg_re- peatCall_art, etc. The features associated with the agent model 308 may relate to a length of time to fix score, Total_churn_in_LOT/Total_Freq_LOT, curr_csv/ avg_CLV_ LOT,repeatCall/avg_repeatCall_LOT, etc.

In some embodiments, derived features are created. The derived features may include an action required feature corresponding to a troubleshooting step that is to be per- formed by a user. The action requested feature may be set to a 0 or other value if no action is required and to a 1 of other value is an action is required, for example. The derived features may include an expected customer lifetime value feature corresponding to how much a customer lifetime value will decline from a device downgrade or service plan downgrade. The derived features may include a customer lifetime value impact feature that may be set to a 0 or other value if there is no impact and set to a 1 or other value if there is an impact on a cluster lifetime value, for example.

In some embodiments, the features relate to device and plan recommendation features 320. A plan may relate to a network service plan with a network service provider of the communication network. The device and plan recommen- dation features 320 may be generated by models 318 hosted by a device and plan recommender pipeline 316. A first model may recommend a device and/or plan based upon location. A second model may recommend a device and/or plan based upon service cancellation (churn). A third model may recommend a device and/or plan based upon a customer lifetime value. A fourth model may recommend a device and/or plan based upon personalization. A fifth model may generate a device and/or plan recommendation based upon outputs from the first model, the second model, the third model, and/or the fourth model. For example, if any recom- mended item from models 1 to 4 is >0.5, then the recom- mended item is selected. That is, device and plan recom- mendations are derived from the 4 models (e.g., demography or location, churn, customer lifetime value, and personalization). If all 4 models output a value greater than a 0.5 threshold for the same item such as device or plan (e.g., a model may output a value between 0 and 1 in terms of how likely a recommendation the item such as switching to a particular device or plan change solve an issue), then the item is recommended to a user. Else if a recommended item from model 2 is >0.5, then the recommended item is selected. Else if a recommended item from model 4 is >0.5, then the recommended item is selected. Else if a recom- mended item from model 3 is >0.5, then the recommended item is selected. Else, a recommended item from model 1 is selected. The recommended item may be used as part of the device and plan recommendation feature 320. In this way, various features 402 are identified for use by the solution content identifier 116, as illustrated by FIG. 4.

The solution content identifier 116 may evaluate the communication network to determine whether a low signal is detected. If a low signal is detected, then the features 402 are input into one or more models 404 used by a solution content provider 406 to provide solution content to users and/or agents helping users resolve issues. During operation 204 of method 200, the features 402 are input into the models 404 (e.g., a large language model LLM model or other deep learning algorithm that can perform a variety of natural language processing tasks) to generate a set of resolution recommendations, which may relate to the low signal (e.g., recommendations for how to troubleshoot/fix UE affected by the low signal such as UE connected to a cellular tower with the low signal). In some embodiments, the set of resolution recommendations include a trouble- shooting action, a device exchange action, a device recom- mendation, a network device recommendation, a plan change recommendation, a network needed but no service found notification, a no solution notification, an article, and/or a length of time to fix. During operation 206 of method 200, a recommender pipeline of the solution content provider 406 selects a particular resolution recommendation from the set of resolution recommendations. In some embodiments, the scores generated by the agent model 308 may be used to generate or select a particular resolution recommendation (e.g., a resolution recommendation with a largest score may be selected).

In some embodiments, the resolution recommendation is provided as solution content to users such as where the solution content is provided as a proactive resolution to the users for implementation to proactively address an issue that may be related to the low signal. In some embodiments, the solution content of the selected resolution recommendation and/or the entire set of resolution recommendations are provided to an agent in real-time (e.g., provided as real-time solutions) as the agent is helping the user to troubleshoot the issue.

The solution content identifier 116 may track/generate post recommendation metrics 408 for the resolution recom- mendation, the solution content, and/or the set of resolution recommendations, during operation 208 of method 200. The post recommendation metrics 408 may relate to whether a user implemented a resolution action described by the solution content, whether the resolution recommendation solved the issue for users, whether agents and users working together solved the issue using the resolution recommenda- tion and/or the set of resolution recommendations, etc. The post recommendation metrics 408 may include an overall recommendation efficiency score, a calculated value impact score, and/or a calculated resolution impact score identified by a recommendation efficiency scorer 410.

The overall recommended efficiency score may be based upon service cancellation (churn) over a timespan, a number of users with customer lifetime value decline, an expected customer lifetime value decline from the user, and/or a number of resolution recommendations: no. of churn within 7 days UNION (No. of customers whose CLV declined & Is_expected_CLV_decline?=0)/No. of recommendations. The calculated value impact score may be based upon a current customer lifetime value, a pervious customer life- time value, and/or current customer lifetime values for users with no expected customer lifetime value decline: (Current_ CLV-Prev_CLV)/Current_CLV for customers who has Is_expected_CLV_decline as 0. The calculated value impact score may be based upon a maximum threshold, a minimum threshold, and/or an average of repeat service calls: Set Maxthres, Minthres By Business If (Average of repeat calls)>Maxthres:HighRPT Else if (Average of repeat calls) <Minthres:LowRPT Else: MEDRPT. In some embodiments, RSE relates to overall recommended efficiency score, CLVIS relates to a customer lifetime value impact score, RI relates to a resolution impact score, LOW/HIGH/MEDIUM RPT relates to low, high, or medium repeat caller (e.g., if a number of repeat calls from a customer is below a minimum threshold, then the customer is tagged as a low repeat caller, and similar for medium and high thresholds for tagging), and Prev_CLV relates to previous current lifetime value.

During operation 210 of method 200, a follow-up com- ponent 412 may evaluate the post recommendation metrics 408 and scores to identify a user that has not implemented the resolution action described by the solution content. During operation 212 of method 200, the follow-up component 412 sends a follow-up notification to the user to perform the resolution action. The follow-up notification may be sent based upon the post recommendation metrics 408 indicating that the resolution action solved a problem/issue for one or more other users of the communication network. In some embodiments, the determination corresponds to: for all customers/users, verify Is_action_required?=1 and (Is_action_taken?=0 and (RES>0.5 or CLVIS>0.5 or RI==HighRPT). In this way, the user may be prompted/reminded to perform the resolution action that could solve the problem/issue.

Figure 5A:
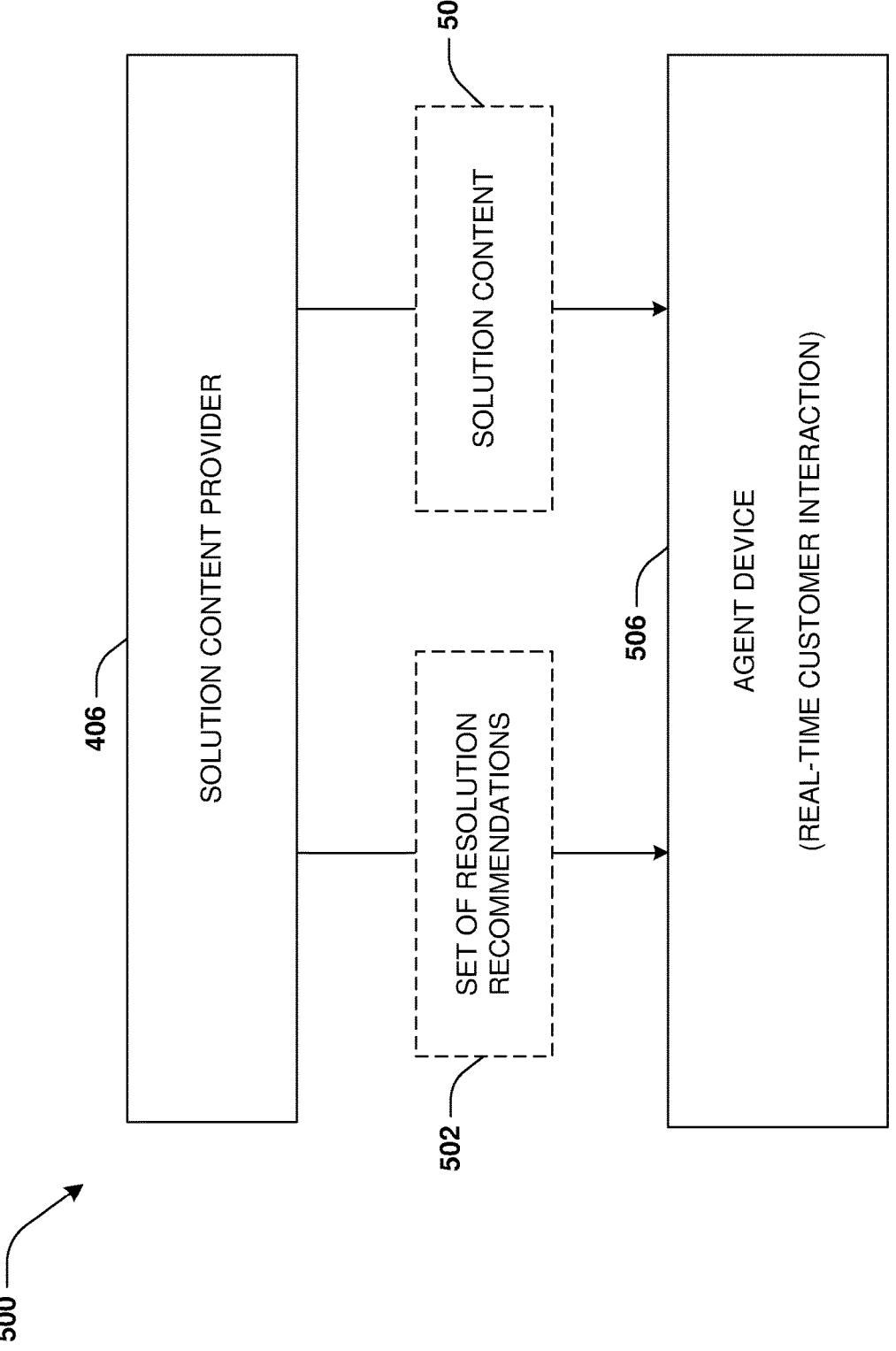
FIG. 5A illustrates an example of a system that includes a solution content provider that provides solution content to an agent device, in accordance with an embodiment of the present technology.
Figure 5B:
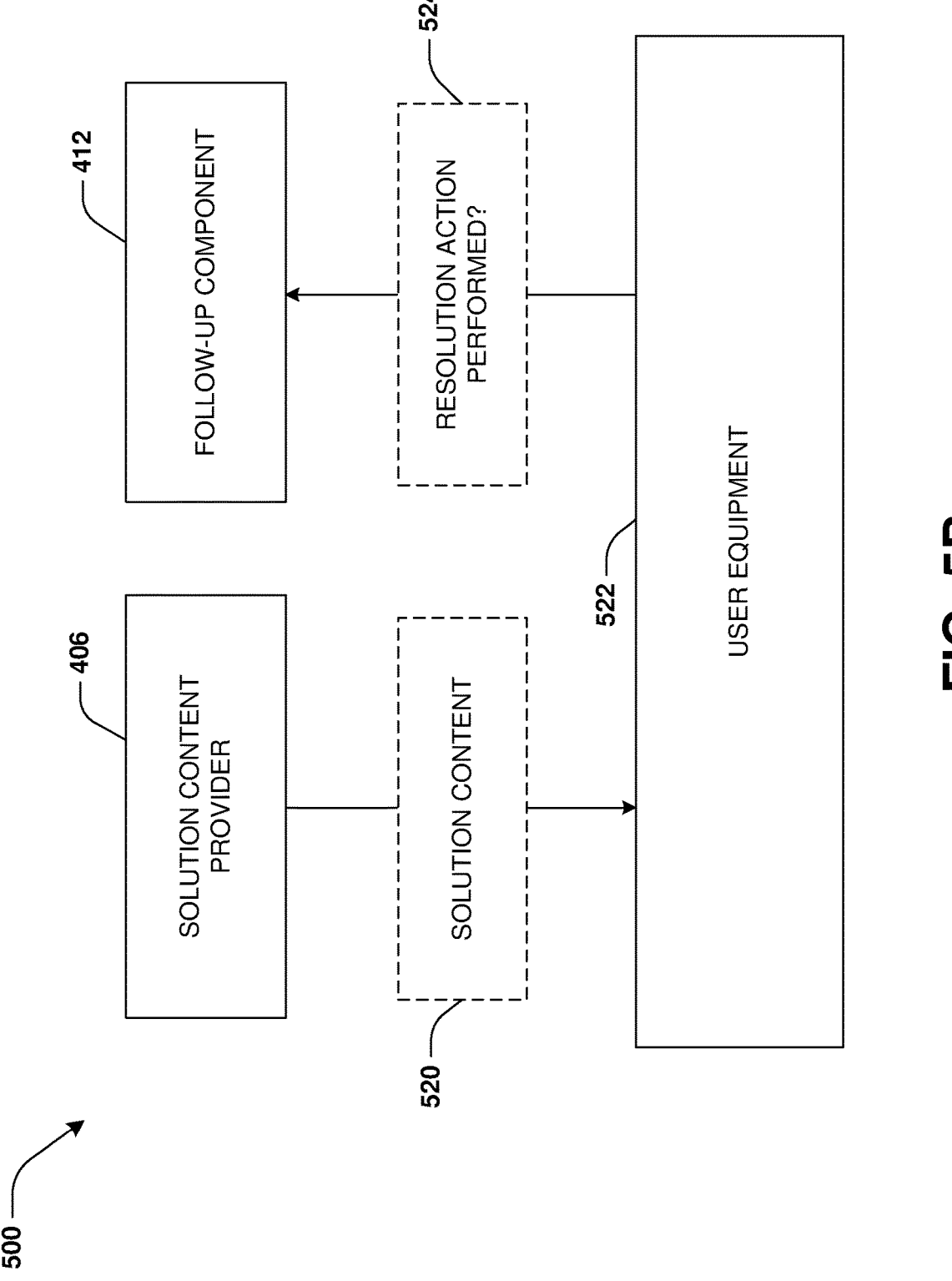
FIG. 5B illustrates an example of a system that includes a solution content provider that provides solution content to a customer device, in accordance with an embodiment of the present technology.
Figure 5C:
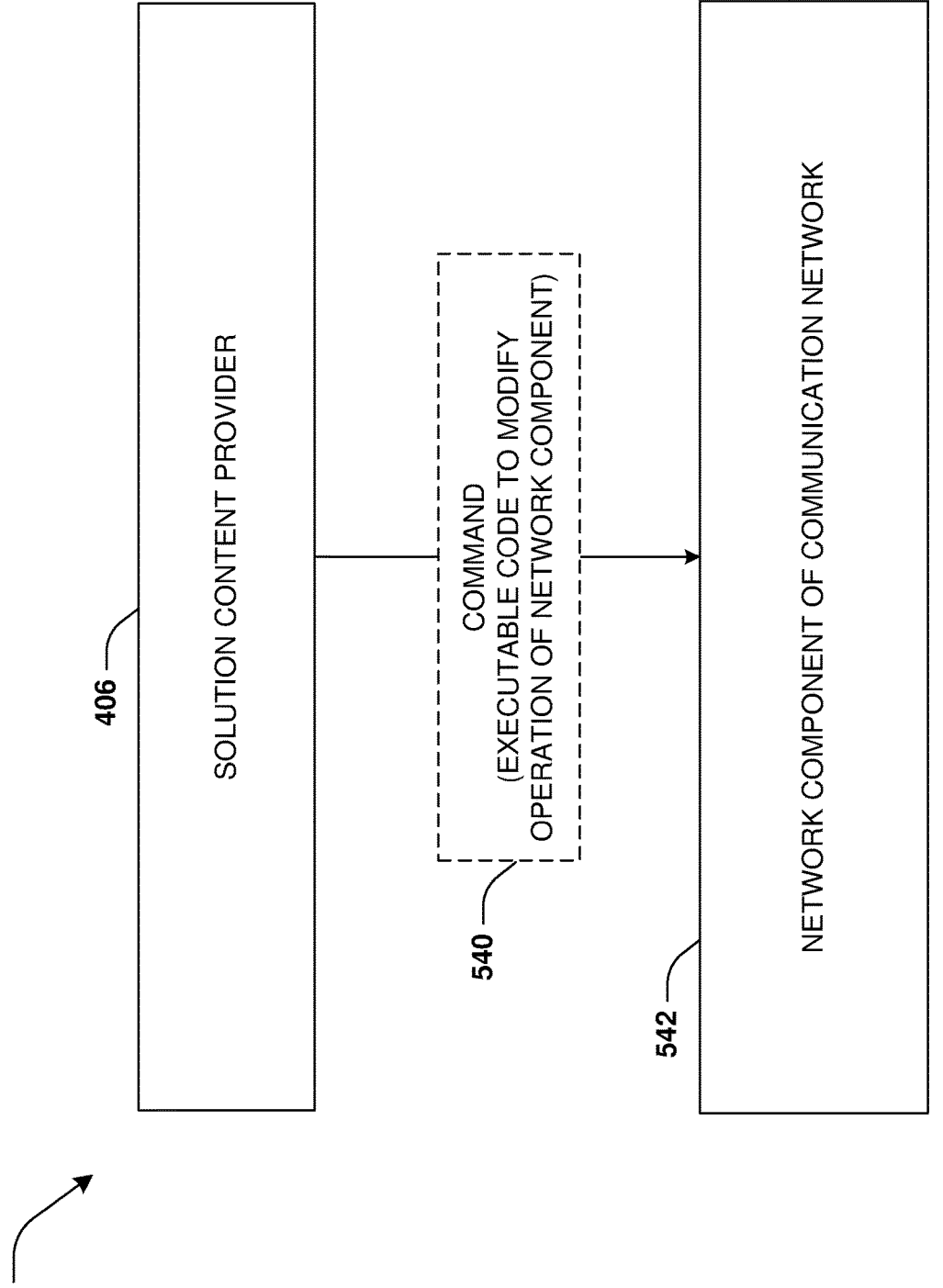
FIG. 5C illustrates an example of a system that includes a solution content provider that modifies operation of a network component within a communication network, in accordance with an embodiment of the present technology.

FIGS. 5A-5C illustrates an example of a system 500 that includes the solution content provider 406 providing solution content to an agent device 506 and/or user equipment 522. The solution content provider 406 may provide a set of resolution recommendations 502 and/or solution content 504 to the agent device 506, as illustrated by FIG. 5A. The set of resolution recommendations 502 and/or the solution content 504 may be provided to the agent device 506 in real-time as an agent of the agent device 506 is interacting with a user experiencing an issue for which the set of resolution recommendations 502 and/or the solution content 504 were generated as potential solutions.

As illustrated by FIG. 5B, the solution content provider 406 may provide solution content 520 to user equipment 522 (e.g., a smart watch, a cellular phone, a laptop, or any other device capable of connecting to a communication network) for resolving an issue experienced by the user equipment 522. The follow-up component 412 may generate and send a follow-up notification to the user equipment 522 based upon a determination 524 that a user of the user equipment 522 did not perform a resolution action described by the solution content 520.

As illustrated by FIG. 5C, the solution content provider 406 may generate a command 540 to modify and/or reconfigure a network component 542 of the communication network (e.g., cell towers, base stations, repeaters, mobile switching centers, radio network controllers, a core network, a radio access network, or other network elements). The command 540 may comprise instructions, configuration parameters, and/or executable code that can be used to modify operation of the network component 542. The command 540 may be generated based upon the resolution recommendation (e.g., a command to redirect UEs from connecting to a network element experiencing degraded performance, an overload, or other issue to a different network element with available resources for handling the redirected UEs). The solution content provider 406 may transmit the command 540 over the communication network to the network component 542 to modify operation of the network component 542 for resolving the issue and improving operation of the communication network and UE connected to the communication network.

FIGS. 5D-5G illustrates examples of charts related to the operation of an AI based communication system. FIG. 5D illustrates a chart 550 describing different resolution types 551 of resolution recommendations such as troubleshooting, a network device recommendation, a service plan change recommendation, an article recommendation, a length of time until an issue can be resolved, etc. The resolution types 551 may correspond to resolutions 553 generated by the AI based communication system using content extracted from data sources 554 for resolving customer queries 552.

FIG. 5D illustrates a chart 560 describing different resolution types 561 of resolution recommendations such as troubleshooting, a network device recommendation, a service plan change recommendation, an article recommendation, a length of time until an issue can be resolved, etc. The resolution types 561 may correspond to resolutions 563 generated by the AI based communication system using content extracted from data sources 564 for resolving customer queries 562.

FIG. 5F illustrates a chart 570 specifying counts of different recommendation resolutions generated for various locations. The recommendation resolutions may include troubleshooting recommendations, device exchange recommendations, network device recommendations, plan change recommendations, need network but no service found messages, no solution messages, article recommendations, and lengths of time until issues can be resolved.

According to some embodiments, a method is provided. The method includes extracting features related to operation of a communication network; in response to detecting a low signal associated with the communication network, inputting the features into a model to generate a set of resolution recommendations related to the low signal; selecting a resolution recommendation from the set of resolution recommendations as solution content to provide to users of the communication network based upon the model indicating that the resolution recommendation has a higher probability of solving the low signal than other resolution recommendations within the set of resolution recommendations; generating post recommendation metrics for the resolution recommendation, wherein the post recommendation metrics include at least one of an overall recommendation efficiency score, a calculated value impact score, or a calculated resolution impact score; evaluating the post recommendation metrics to identify a user that has not implemented a resolution action described by the solution content; and sending a follow-up notification to the user to perform the resolution action.

According to some embodiments, the method includes sending the follow-up notification to the user based upon the post recommendation metrics indicating that the resolution action solved a problem for one or more users of the communication network.

According to some embodiments, the method includes generating the set of resolution recommendations to include at least one of a troubleshooting action, a device exchange action, a device recommendation, a network device recommendation, a plan change recommendation, a network needed but no service found notification, a no solution notification, an article, or a length of time to fix.

According to some embodiments, the method includes extracting the features to include user features comprising at least one of user location, communication plan, data usage, plan pricing, or a number of issues occurring over one or more timespans.

According to some embodiments, the method includes extracting the features to include at least one of a signal feature, potential resolution recommendations based upon historical data, or efficiency of the of the potential resolution recommendations based upon the historical data.

According to some embodiments, the method includes extracting the features to include cluster features with weights of clusters, wherein the cluster features comprise at least one of service cancellations, customer lifetime value, a risk factor, or repeat customer service calls.

According to some embodiments, the method includes calculating the overall recommendation efficiency score based upon service cancellations over a timespan, a number of users with customer lifetime value decline, an expected customer lifetime value decline, and a number of resolution recommendations.

According to some embodiments, the method includes calculating the calculated value impact score based upon a current customer lifetime value, a previous customer lifetime value, and current customer lifetime values for users with no expected customer lifetime value decline.

According to some embodiments, the method includes calculating the calculated value impact score based upon a maximum threshold, a minimum threshold, and an average of repeat calls.

According to some embodiments, a system comprising one or more processors configured for executing the instructions to perform operations, is provided. The operations include extracting features related to operation of a communication network; in response to detecting a low signal associated with the communication network, inputting the features into a model to generate a set of resolution recommendations related to the low signal; selecting a resolution recommendation from the set of resolution recommendations as solution content to provide to users of the communication network based upon the model indicating that the resolution recommendation has a higher probability of solving the low signal than other resolution recommendations within the set of resolution recommendations; generating post recommendation metrics for the resolution recommendation, wherein the post recommendation metrics include at least one of an overall recommendation efficiency score, a calculated value impact score, or a calculated resolution impact score; evaluating the post recommendation metrics to identify a user that has not implemented a resolution action described by the solution content; and sending a follow-up notification to the user to perform the resolution action.

According to some embodiments, the operations further include providing the set of resolution recommendations to an agent as real-time solutions to provide to the user.

According to some embodiments, the operations further include providing the solution content to an agent as real-time solution to provide to the user.

According to some embodiments, the operations further include providing the solution content to the user as proactive resolution.

According to some embodiments, the operations further include creating, by the model, derived features that include at least one an action required feature, an expected customer lifetime value feature, or a customer lifetime value impact feature.

According to some embodiments, a non-transitory computer-readable medium storing instructions that when executed facilitate performance of operations, is provided. The operations include extracting features related to operation of a communication network; in response to detecting a low signal associated with the communication network, inputting the features into a model to generate a set of resolution recommendations related to the low signal; selecting a resolution recommendation from the set of resolution recommendations as solution content to provide to users of the communication network based upon the model indicating that the resolution recommendation has a higher probability of solving the low signal than other resolution recommendations within the set of resolution recommendations; generating post recommendation metrics for the resolution recommendation, wherein the post recommendation metrics include at least one of an overall recommendation efficiency score, a calculated value impact score, or a calculated resolution impact score; evaluating the post recommendation metrics to identify a user that has not implemented a resolution action described by the solution content; and sending a follow-up notification to the user to perform the resolution action.

According to some embodiments, the operations further include implementing a set of models to recommend a device or plan based upon at least one of a location, service cancellations, a customer lifetime value, or personalization.

According to some embodiments, the operations further include executing a recommender pipeline to select a recommendation from recommendations output by the set of models.

According to some embodiments, the operations further include generating the features to include cluster features with weights of clusters in terms of service cancellations, customer lifetime values, risk factors, or repeat customer service calls.

According to some embodiments, the operations further include generating a command based upon the resolution recommendation; and transmitting the command over the communication network to a network component within the communication network to modify operation of the network component.

According to some embodiments, the operations further include reconfiguring a network component within the communication network based upon the resolution recommendation.

Figure 6:
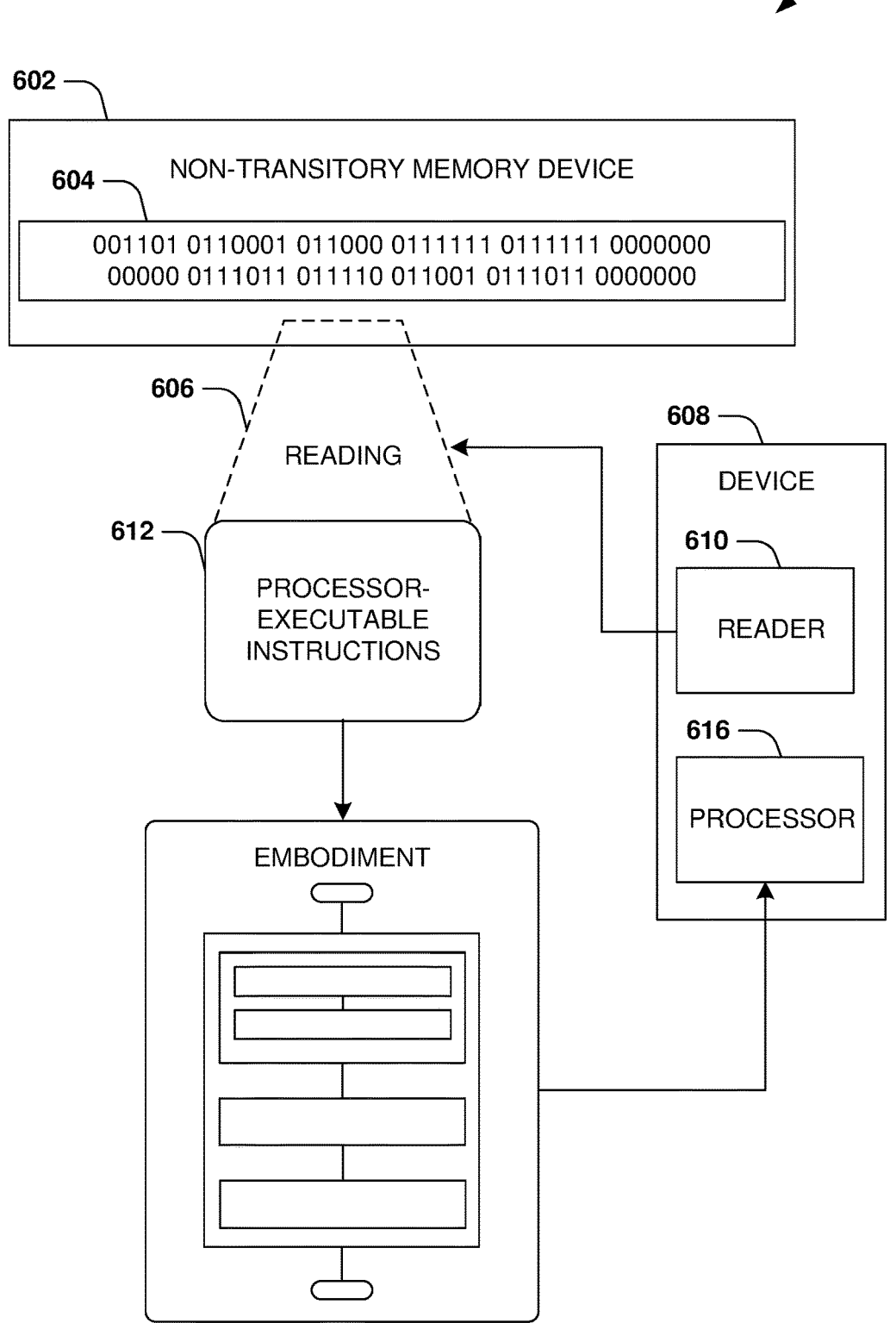
FIG. 6 is an illustration of example networks that may utilize and/or implement at least a portion of the techniques presented herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of example system 300 of FIG. 4, and/or at least some of the example system 400 of FIG. 4.

Figure 7:
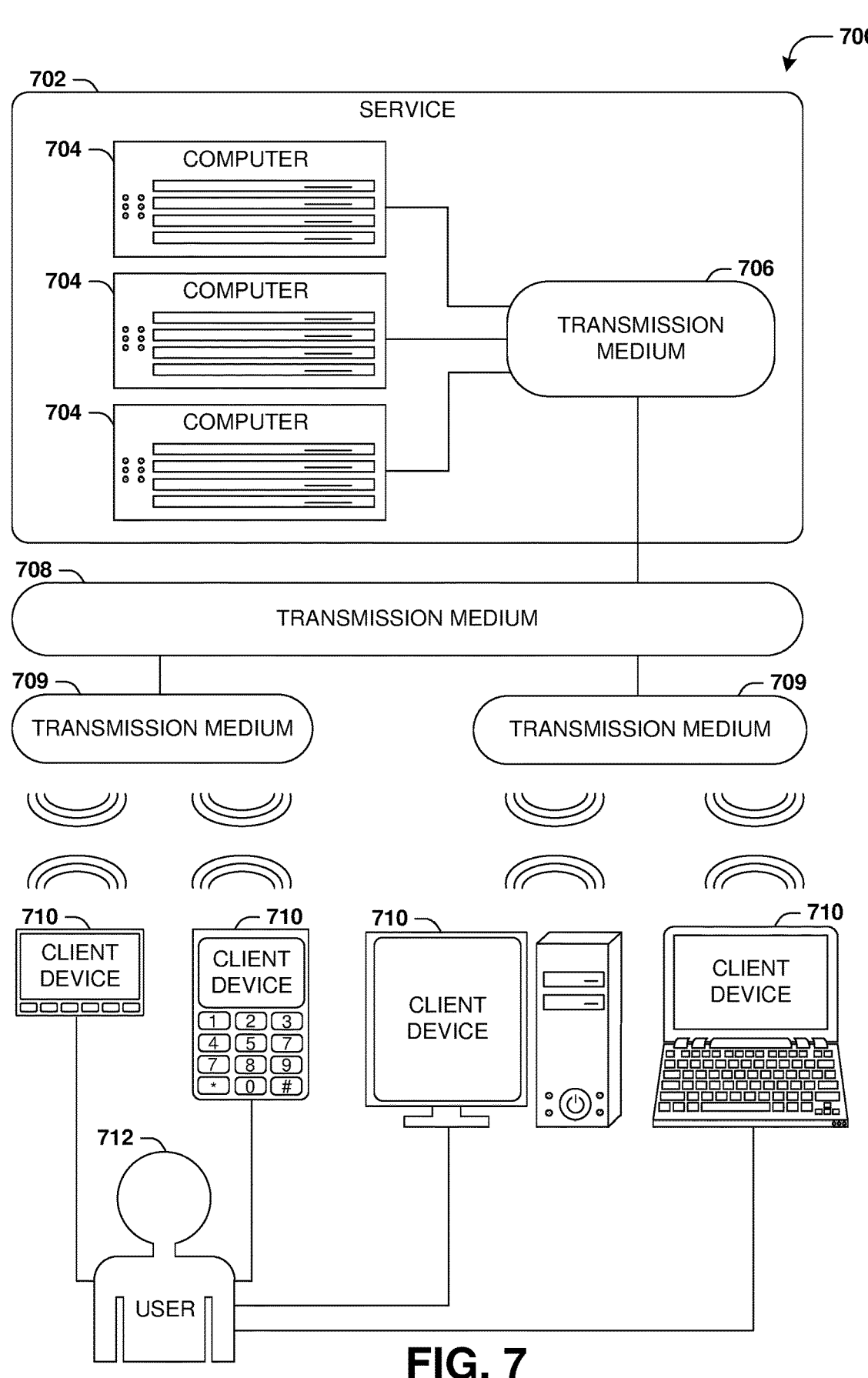
FIG. 7 is an illustration of a scenario involving an example configuration of a computer that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

In some embodiments, the computers 704 may be host devices and/or the client device 710 may be devices attempting to communicate with the computer 704 over buses for which device authentication for bus communication is implemented.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 709 provided by a cellular provider. As a second such example, one or more client devices 710 may communicate with the service 702 by connecting to the transmission medium 708 via a transmission medium 709 provided by a location such as the user's home or workplace (e.g., a Wi-Fi (Institute of Electrical and Electronics Engineers (IEEE) Standard 802.11) network or a Bluetooth (IEEE Standard 802.15.1) personal area network). In this manner, the computers 704 and the client devices 710 may communicate over various types of transmission mediums.

Figures 8, 9:
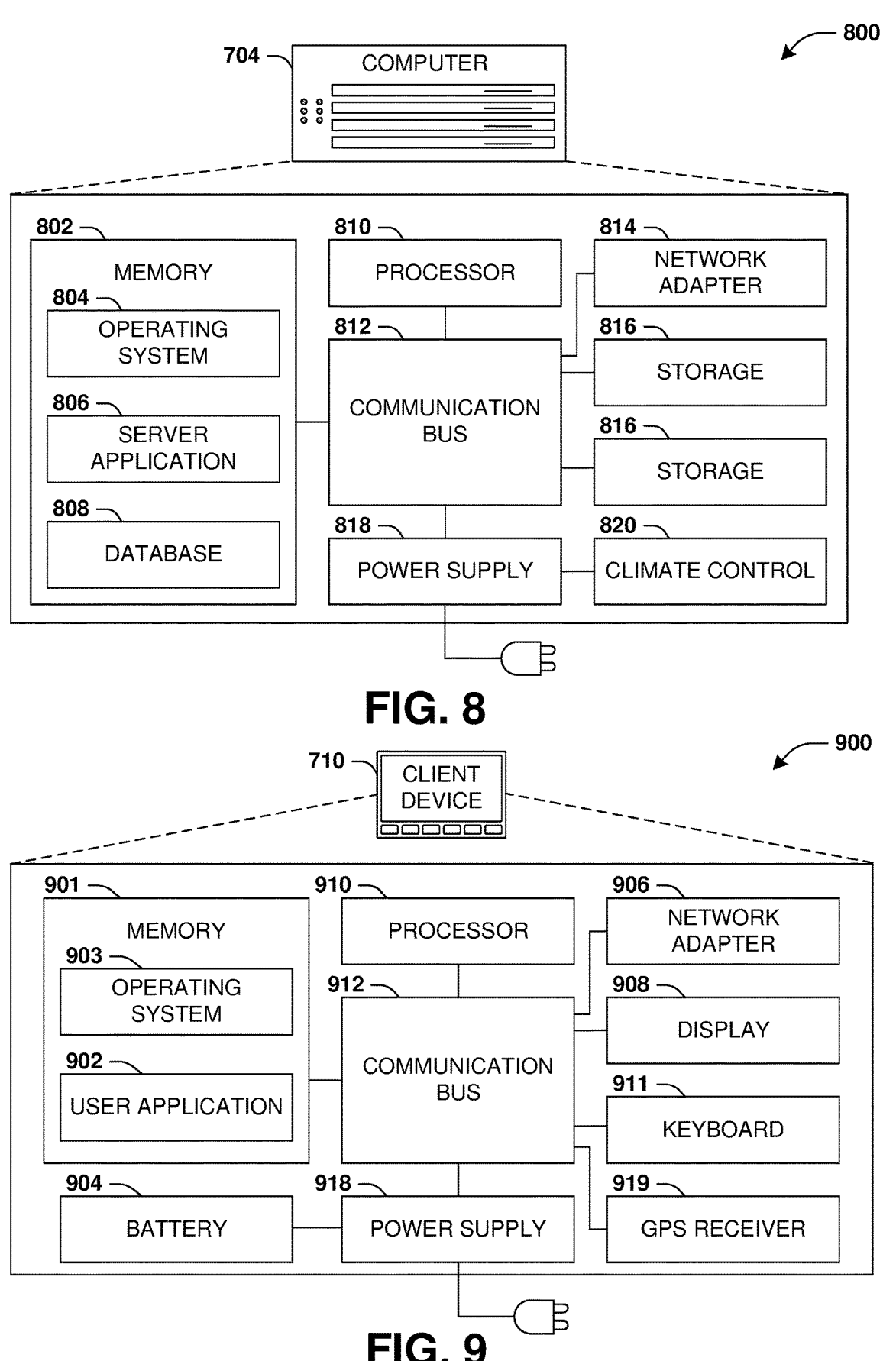
FIG. 8 is an illustration of a scenario involving an example configuration of a client that may utilize and/or implement at least a portion of the techniques presented herein.
FIG. 9 is an illustration of a scenario featuring an example non-transitory machine readable medium in accordance with one or more of the provisions set forth herein.

FIG. 8 presents a schematic architecture diagram 800 of a computer 804 that may utilize at least a portion of the techniques provided herein. Such a computer 804 may vary widely in configuration or capabilities, alone or in conjunction with other computers, in order to provide a service.

The computer 804 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 804 may comprise memory 802 storing various forms of applications, such as an operating system 804; one or more computer applications 806; and/or various forms of data, such as a database 808 or a file system. The computer 804 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 804 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 804 with at least one other computer. Other components that may optionally be included with the computer 804 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 804 to a state of readiness.

The computer 804 may operate in various physical enclosures, such as a desktop or tower, and/or may be integrated with a display as an "all-in-one" device. The computer 804 may be mounted horizontally and/or in a cabinet or rack, and/or may simply comprise an interconnected set of components. The computer 804 may comprise a dedicated and/or shared power supply 818 that supplies and/or regulates power for the other components. The computer 804 may provide power to and/or receive power from another computer and/or other devices. The computer 804 may comprise a shared and/or dedicated climate control unit 820 that regulates climate properties, such as temperature, humidity, and/or airflow. Many such computers 804 may be configured and/or adapted to utilize at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:
extracting features related to operation of a communication network;
in response to detecting a low signal associated with the communication network, inputting the features into a model to generate a set of resolution recommendations related to the low signal;
selecting a resolution recommendation but not one or more other resolution recommendations from the set of resolution recommendations as solution content to provide to a plurality of users of the communication network based upon the model indicating that the resolution recommendation has a higher probability of solving the low signal than the one or more other resolution recommendations within the set of resolution recommendations;
after providing the resolution recommendation to the plurality of users as solution content, generating post recommendation metrics associated with implementation of for the resolution recommendation by the plurality of users, wherein the post recommendation metrics include at least one of an overall recommendation efficiency score, a calculated value impact score, or a calculated resolution impact score;
evaluating the post recommendation metrics to identify a user, of the plurality of users, that has not implemented a resolution action described by the solution content; and
sending a follow-up notification to the user to perform the resolution action.

2. The method of claim 1, comprising:
sending the follow-up notification to the user based upon the post recommendation metrics indicating that the resolution action solved a problem for one or more users of the communication network.

3. The method of claim 1, comprising:
generating the set of resolution recommendations to include at least one of a troubleshooting action, a device exchange action, a device recommendation, a network device recommendation, a plan change recommendation, a network needed but no service found notification, a no solution notification, an article, or a length of time to fix.

4. The method of claim 1, comprising:
extracting the features to include user features comprising at least one of user location, communication plan, data usage, plan pricing, or a number of issues occurring over one or more timespans.

5. The method of claim 1, comprising:
extracting the features to include at least one of a signal feature, potential resolution recommendations based upon historical data, or efficiency of the of the potential resolution recommendations based upon the historical data.

6. The method of claim 1, comprising:
extracting the features to include cluster features with weights of clusters, wherein the cluster features comprise at least one of service cancellations, customer lifetime value, a risk factor, or repeat customer service calls.

7. The method of claim 1, comprising:
calculating the overall recommendation efficiency score based upon:
service cancellations over a timespan,
a number of users with customer lifetime value decline,
an expected customer lifetime value decline, and
a number of resolution recommendations.

8. The method of claim 1, comprising:
calculating the calculated value impact score based upon:
a current customer lifetime value,
a previous customer lifetime value, and
current customer lifetime values for users with no expected customer lifetime value decline.

9. The method of claim 1, comprising:
calculating the calculated value impact score based upon:
a maximum threshold,
a minimum threshold, and
an average of repeat calls.

10. A system, comprising:
one or more processors configured for executing instructions to perform operations comprising:
extracting features related to operation of a communication network;
in response to detecting a low signal associated with the communication network, inputting the features into a model to generate a set of resolution recommendations related to the low signal;
selecting a resolution recommendation but not one or more other resolution recommendations from the set of resolution recommendations as solution content to provide to a plurality of users of the communication network based upon the model indicating that the resolution recommendation has a higher probability of solving the low signal than the one or more other resolution recommendations within the set of resolution recommendations;
after providing the resolution recommendation to the plurality of users as solution content, generating post recommendation metrics associated with implementation of the resolution recommendation by the plurality of users, wherein the post recommendation metrics include at least one of an overall recommendation efficiency score, a calculated value impact score, or a calculated resolution impact score;
evaluating the post recommendation metrics to identify a user, of the plurality of users, that has not implemented a resolution action described by the solution content; and
sending a follow-up notification to the user to perform the resolution action.

11. The system of claim 10, wherein the operations further comprise:
providing the set of resolution recommendations to an agent as real-time solutions to provide to the user.

12. The system of claim 10, wherein the operations further comprise:
providing the solution content to an agent as real-time solution to provide to the user.

13. The system of claim 10, wherein the operations further comprise:

providing the solution content to the user as proactive resolution.

14. The system of claim 10, wherein the operations further comprise:

creating, by the model, derived features that include at least one an action required feature, an expected customer lifetime value feature, or a customer lifetime value impact feature.

15. A non-transitory computer-readable medium storing instructions that when executed facilitate performance of operations comprising:

extracting features related to operation of a communication network;

in response to detecting a low signal associated with the communication network, inputting the features into a model to generate a set of resolution recommendations related to the low signal;

selecting a resolution recommendation but not one or more other resolution recommendations from the set of resolution recommendations as solution content to provide to a plurality of users of the communication network based upon the model indicating that the resolution recommendation has a higher probability of solving the low signal than the one or more other resolution recommendations within the set of resolution recommendations;

after providing the resolution recommendation to the plurality of users as solution content, generating post recommendation metrics associated with implementation of for the resolution recommendation by the plurality of users, wherein the post recommendation metrics include at least one of an overall recommendation efficiency score, a calculated value impact score, or a calculated resolution impact score;

evaluating the post recommendation metrics to identify a user, of the plurality of users, that has not implemented a resolution action described by the solution content; and sending a follow-up notification to the user to perform the resolution action.

16. The non-transitory computer-readable medium of claim 15, wherein the operations further comprise:

implementing a set of models to recommend a device or plan based upon at least one of a location, service cancellations, a customer lifetime value, or personalization.

17. The non-transitory computer-readable medium of claim 16, wherein the operations further comprise:

executing a recommender pipeline to select a recommendation from recommendations output by the set of models.

18. The non-transitory computer-readable medium of claim 15, wherein the operations further comprise:

generating the features to include cluster features with weights of clusters in terms of service cancellations, customer lifetime values, risk factors, or repeat customer service calls.

19. The non-transitory computer-readable medium of claim 16, wherein the operations further comprise:

generating a command based upon the resolution recommendation; and transmitting the command over the communication network to a network component within the communication network to modify operation of the network component.

20. The non-transitory computer-readable medium of claim 16, wherein the operations further comprise:

reconfiguring a network component within the communication network based upon the resolution recommendation.

\* \* \* \* \*